United States Patent Office 2,836,904
Patented June 3, 1958

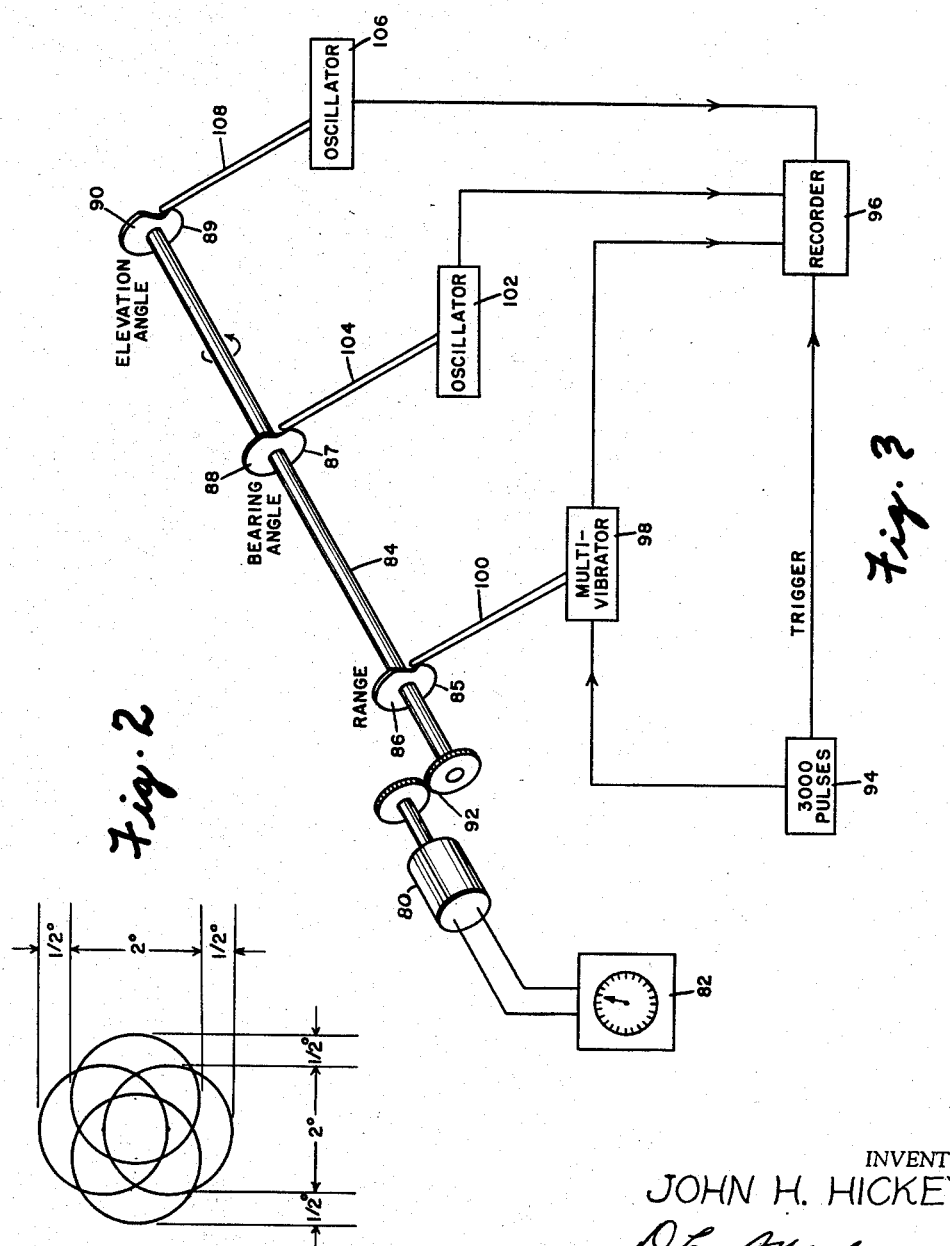

2,836,904

RADAR FIRE CONTROL TRAINING SYSTEM

John H. Hickey, Port Washington, N. Y.

Application October 6, 1954, Serial No. 460,786

14 Claims. (Cl. 35—10.4)

(Granted under Title 35, U. S. Code (1952), sec. 266)

The invention described herein may be manufactured and used by or for the Government of the United States of America for governmental purposes without the payment of any royalties thereon or therefor.

This invention relates, in general, to training devices and more particularly to a device that generates synthetic moving radar targets upon a fire control radar screen for the training of gun directing personnel.

This invention facilitates the training of personnel in the accurate and efficient use of gun fire control ssytems. At the present time, a gun crew is trained by using the complete fire control system in conjunction with an aircraft or a multiplicity of aircraft. The aircraft travel through discrete maneuvers that are within radar range of the gun location. The gun crews are required to track the targets (aircraft) and thus develop speed, skill and dexterity in the accurate manipulations and positioning of the gun.

The present day method of training fire control gun crews is expensive in that the operational costs of the aircraft are high and, if the gun crew that is being trained is located on board a ship, the operational costs of the ship must be included. The major disadvantage inherent in the present day method is that the training periods are completely dependent upon the prevailing weather conditions and are limited to the daylight hours.

This invention consists of a tape recorder that contains a plurality of channels that represent the bearing from a chosen reference point, the elevation angle from the radar antenna, the slant range of the target and a trigger pulse. This information is utilized by the fire control radar unit to generate a synthetic target. Since the target is generated by synthetic means, the fire control gun crew can receive the necessary training at some pre-arranged time intervals and at a non-tactical locale.

The primary object of this invention is to generate moving synthetic targets on a fire control radar screen.

Another object is to provide a device that can be utilized to train fire control gun crews without dependency upon tactical operations or prevailing weather conditions.

An additional object is to provide a device that will generate a synthetic target that can be programmed to reproduce accurately the maneuvers of an actual aircraft.

Other objects and many of the attendant advantages of this invention will be readily appreciated as the same becomes better understood by reference to the following detailed description when considered in connection with the accomapnying drawings wherein:

Figure 2 illustrates the wobbled frequency to generate the conical scan.

Figure 3 is a diagram of the recording mechanism that is utilized to represent the synthetic target by generating a plurality of discrete frequencies upon a magnetic tape.

Similar numerals refer to similar parts throughout the several views.

Figure 1:
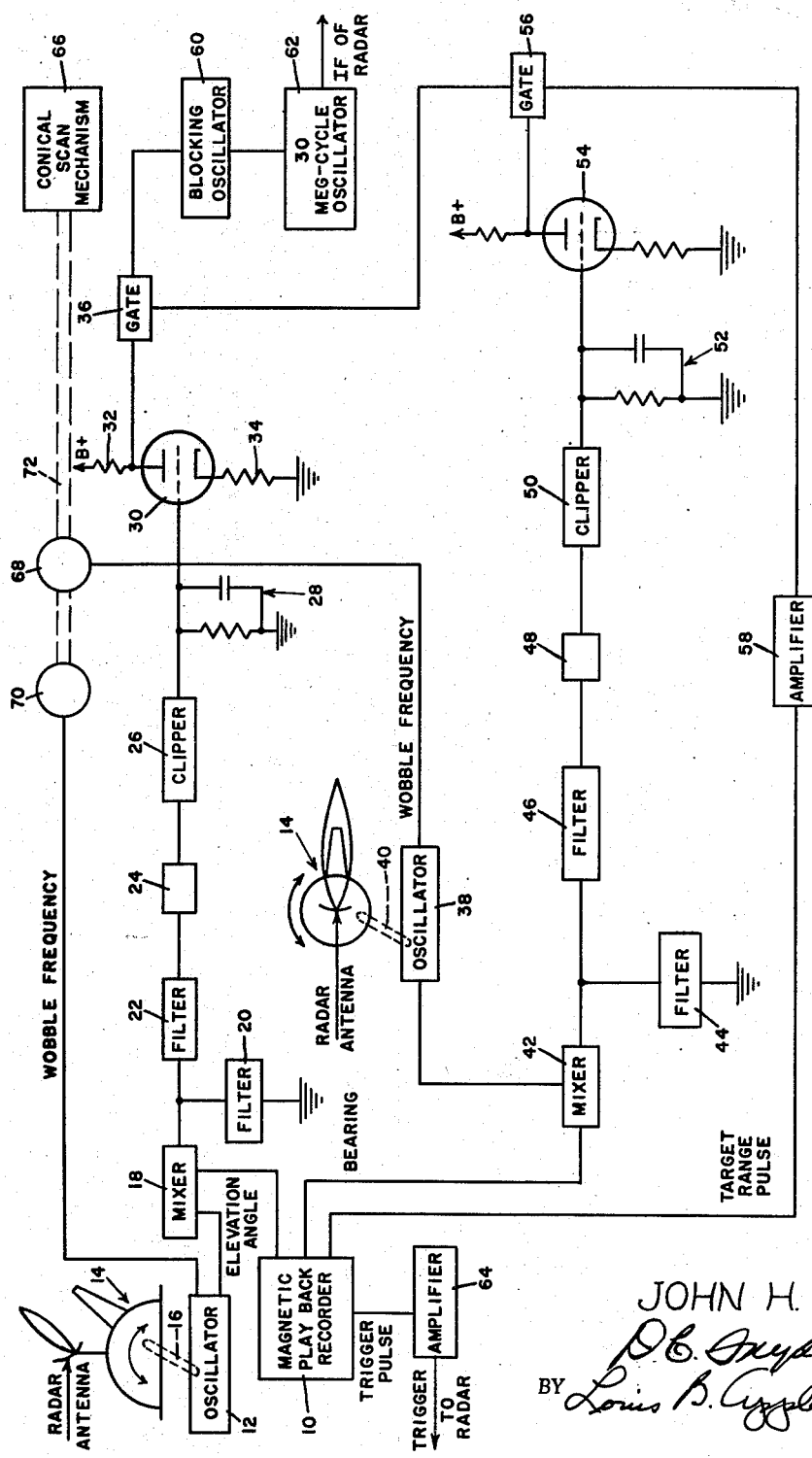
Figure 1 is a block diagram of a simulated moving radar target system, showing a preferred embodiment of this invention.

This invention cooperates with the standard shipboard fire control radar unit by generating within said radar unit a synthetic target that represents an enemy aircraft and by indicaing the orientation of the gun relative to the target. A conventional magnetic tape is incorporated within a magnetic recorder play-back unit 10.

The magnetic tape contains four separate channels. These four channels carry signals representing the target bearing from a chosen reference point, the elevation angle of the target from the radar antenna, the slant range of the target and the trigger pulse. These recorded signals represent the programmed course of the target aircraft. Thus, it can be readily appreciated that the range, speed and course of the target aircraft can be pre-arranged to any desired combination to provide a suitable test of the skill and dexterity of the gun crew.

Any range of frequencies that can be recorded can be used for the bearing and elevation signals. In this particular application it was determined that a range of frequency of 900 cycles would equal 0 to 90 degrees of gun elevation, and 1800 cycles would equal 180 degrees of rotation. The target range is represented and generated by recording the trigger pulse that synchronizes the radar unit and also recording another pulse to represent the range. If the radar unit is triggered at the rate of 3000 pulses per second, then there is a space of approximately 333 micro-seconds between pulses. This time space represents approximately twenty-seven miles of range on the radar scope. The range pulse is recorded alongside the trigger pulse on another channel. Said range pulse is placed between successive trigger pulses. By this method, only one range pulse need be recorded for each trigger pulse, thus making it unnecessary to record more than 3000 pulses per second.

The frequency that represents the elevation of the target aircraft varies from 900 to 1800 cycles per second. An oscillator 12 which may be any suitable oscillator such as the Wien-Bridge oscillator shown on page 152 of "Radar Electronic Fundamentals," NavShips 900,016 published in June 1944 by the Bureau of Ships, Navy Department, is connected mechanically to cooperate with variations in the elevation of the gun 14 and its associated radar antenna by some convenient mechanical connection means 16. The oscillator is present to generate a range of frequencies that varies from 900 to 1800 cycles per second. The gun 14 and its associated radar antenna is connected to cooperate with and vary the generated output frequency of said oscillator at a uniform specific rate wherein a one degree change of gun antenna elevation will alter the generated output frequency of the oscillator 12 by ten cycles per second. The output of said oscillator 12 will thus vary from 900 cycles to 1800 cycles depending upon the angle of elevation of the gun 14. This may be accomplished by any convenient method as, for example, by replacing feedback resistor $R_1$ (of the Wien-Bridge oscillator referred to above) with a potentiometer of proper value and mechanically coupling the potentiometer arm with the elevation mechanism of the gun or of the antenna. Another method would be to control the position of the condenser or potentiometer by means of a servomotor which is controlled by a synchro system coupled to the radar antenna or gun elevational mechanism.. A conventional mixer 18 is connected to receive and combine the output of the oscillator 12 with the recorded frequency from the magnetic recorder play-back unit 10. The mixer 18 used may be any conventional mixer, such as the frequency converter shown on page 967 of the "Radiotron Designer's Handbook," fourth edition, published and distributed by the Radio Corporation of America, Harrison, New Jersey. This converter may be employed by removing the oscillator components connected between the cathode and the first grid, and applying the recorded frequency of the play-back unit 10 between these tube elements. The output of said mixer 18 appears as a combination of the two fundamental, and the sum and difference of the two fundamental, frequencies. A plurality of filters 20 and 22 are connected to receive the output of the mixer 18. The filter 20 is connected between the output of said mixer 18 and ground. Said filter 20 is designed to pass only the fundamentals and the sum of the frequencies generated by the recorder 10 and the oscillator 12. Thus, these frequencies are shorted to ground through the filter 20. The other filter 22 is connected to receive the output of the mixer 18. Said filter 22 is designed to pass the difference of the fundamental frequencies only. Thus, the frequency that appears at the output terminals of the filter 22 is the difference between the frequency that is generated by the oscillator 12 and the angle of elevation channel of the play back recorder 10. The frequency differential is then squared and differentiated by a conventional squarer and differentiator 24. Said unit 24 is connected to receive the output of the filter 22. For example, the squarer may be the overdriven amplifier shown in Figure 179 on page 168, and the differentiator may be a capacitor and resistor network as shown in Figure 182 on page 170 of "Radar Electronic Fundamentals," idem. The output of said unit 24 is connected to a clipper 26 that is designed to remove or clip the positive portions of a voltage wave, and pass the negative portion of said voltage wave. The differentiator and clipper circuit may be as shown in Figure 190 on page 176 of "Radar Electronic Fundamentals," idem, where a diode clipper is connected in parallel with the resistance element of the differentiator network. Thus, the voltage wave that appears at the output of the clipper 26 is in the form of a plurality of negative voltage pulses having a frequency that is equal to the difference between the recorded angle of elevation of the target frequency and the generated frequency from the oscillator 12 that represents the angle of elevation of the gun antenna. The time constant of the resistance capacitance network 28 is adjusted so that ten pulses per second or less permits the tube 30 to conduct. Thus the tube 30 cannot conduct current unless the number of pulses from the clipper 26 is less than ten per second. The tube 30 is operated in the standard acceptable manner, said tube having a plate resistor 32 and a cathode resistor 34 of convenient values. The plate supply voltage B+ (not shown) is obtained from a conventional power supply unit. The plate circuit of the tube 30 is connected to operate the gate 36, which may, for example, be a conventional coincidence amplifier such as the circuit shown in Figure 10.13 on page 377 of vol. 19, MIT Radiation Laboratory Series.

The bearing circuit is similar to the angle of elevation circuit. A recorded frequency that represents the bearing of the target aircraft is received from the magnetic play back unit 10. This recorded frequency varies from 1000 cycles to 2800 cycles so that one degree is represented by ten cycles. An oscillator 38, which may be similar to oscillator 12, is connected to the gun mount 14 and the radar antenna by some convenient means 40 that varies the frequency output of the oscillator in accordance with the angular position of the gun mount 14 and its antenna. Thus, for each angular position of said gun mount 14, said oscillator generates a distinct predetermined frequency. The frequency that is generated by the oscillator 38 is combined with the recorded bearing frequency within the mixer 42. The sum and the fundamental frequencies of said two combined frequencies are filtered out by the filter 44. The difference of the two frequencies only is passed by the filter 46 to a squarer and differentiator 48 within which it is squared and differentiated. This voltage wave is then fed into the clipper 50, wherein the positive portions only of the wave are removed. Thus, the output of said clipper 50 is a plurality of negative voltage pulses having a frequency that is equal to the difference of the generated oscillator frequency and the recorded bearing frequency. The output of said clipper 50 is connected to a resistive-capacitive network 52 that is connected between the grid and cathode of a vacuum tube 54. The time constant of said R–C circuit 52 is such that ten negative voltage pulses per second or less permits the tube 54 to conduct. More than ten negative pulses per second keeps the tube at cutoff. As the number of pulses per second decreases, the bias decreases and the tube 54 conducts more current. When the gun mount 14 is directed exactly to the target, there will not be any pulses and the conductivity of the tube will be the greatest. The plate circuit of the tube 54 is connected to cooperate with the gate 56.

The circuits and mechanisms employed in the bearing circuit are similar to those employed in the angle of elevation circuit and therefore repetition of references is unnecessary.

The range of the target aircraft is recorded on another channel upon the magnetic tape and appears as a plurality of voltage pulses that vary in phase relative to the trigger pulses in accordance with the programmed range of the enemy aircraft. The target range is represented and generated by recording the trigger pulse that synchronizes the radar unit and another pulse that is displaced with respect to time from the recorded trigger pulse on two separate channels. If the radar unit is triggered at the rate of three thousand pulses per second, then there is a time space of approximately 333 micro-seconds between pulses. This time space represents approximately twenty-seven miles of range on a radar scope. The trigger pulse is recorded on one channel. On another channel that is in close proximity to the trigger pulse channel, the range pulse is recorded. The range pulse is recorded between each successive trigger pulse. Thus, to record the range by this method, it is not necessary to record more than three thousand pulses per second.

The range pulse is received from the play-back recorder 10 and amplified within the amplifier 58. The target range plus voltage is fed into the bearing controlled gate 56. When the radar antenna of the gun mount is directed within one degree of the same bearing reading as is the target, the gate 56 operates to allow the range voltage pulse to pass through to the elevation gate 36. At the instant that the radar antenna of the gun mount is oriented to within one degree of the same angle of elevation as the programmed target, the angle of elevation gate 36 will operate to allow said target range voltage pulse to pass through to the blocking oscillator 60. A blocking oscillator which may be employed is shown in Figure 12 on page 18 of section 9 of the "Electrical Engineers Handbook," 4th edition, Communication-Electronics Volume, by Pender and McIlwain. The "C" bias should be high enough to limit oscillation only to the period of the input trigger pulse. The output of said oscillator 60 is utilized to trigger an oscillator that operates at the intermediate frequency of the radar unit such as a thirty megacycle oscillator 62, the output of which is fed into an I. F. portion of a radar unit. The trigger pulse that is recorded on the magnetic tape is amplified in the amplifier 64 and then transmitted to trigger the radar unit.

As is well known to those experienced in the art, a radar beam is oriented at specific instances to generate a conical scan pattern. The radar conical scan motor or a motor 66 to represent a conical scan motor is rotated at a specific prearranged speed. Two condensers or potentiometers 68 and 70 are connected to cooperate with and to be rotated by said motor 66 through a shaft 72. If the oscillators 12 and 38 employ the Wien-Bridge circuit previously referred to, condensers or potentiometers 68 and 70 may be substituted for the proper one of the elements $R_2$, C or $C_2$. One unit 68, is connected electrically to the bearing oscillator 38. As the value of the unit 68 is varied from a maximum to a minimum by the action of the conical scan motor 66, the output of the bearing oscillator, as determined by the bearing of the radar antenna, is altered plus and minus a predetermined amount such as one-half a degree. The other unit 70 is connected electrically to wobble or increase and then decrease the frequency as determined by the angle of elevation of the radar antenna approximately one-half a degree. The increase and decrease of the frequencies can conform to any particular desired antenna scan pattern as is determined by the design and configuration of the potentiometers or condensers 68 and 70. As a change in frequency is effectively a change in position of the radar beam; the effect of wobbling the frequency of the angle of elevation oscillator and the angle of bearing oscillator is effectively the generation of a cone of radiated energy having its apex at the radar antenna that is mounted on the gun mount.

Thus, referring to Figure 2, to rotate a two degree beam to generate an overall three degree conical scan, both the elevation and bearing oscillators are wobbled five cycles on each side of the center frequency as determined by the bearing and elevation angle of the radar antenna.

Figure 3 discloses a means of recording four channels on a single magnetic tape. An electric motor 80 is operated at a convenient speed, as determined by the speed control unit 82. The control unit 82 is designed to vary the speed of said motor 80 within wide limits. A shaft 84 is pinned or soldered to a plurality of three cams 86, 88 and 90 that represent the range, bearing and elevation angle respectively of a target aircraft. Said shaft 84 is rotated by said motor 80 through a plurality of gears 92. A three thousand cycle oscillator 94 operates as a trigger and is connected to be recorded on one channel of a tape recorder 96. The three thousand cycle output of said oscillator 94 is also fed into a one shot multivibrator 98. The on period, relative to the off period of said multivibrator 98 is controlled by the periphery 85 of the range cam 86 through the action of the cam follower 100. The output of said one shot multivibrator 98 is first shaped to the desired configuration by circuits (not shown) that are well known in the art, and is then fed into and recorded on another channel of said tape recorder 96. An oscillator 102 that has a frequency range that varies from one thousand cycles to two thousand eight hundred cycles cooperates with the bearing cam 88 through the cam follower 104 so that the output or generated frequency is determined by the periphery 87 and the position of the bearing cam 88. The output frequency of said oscillator 102 is fed into and recorded on a third channel of the recorder 96.

Another oscillator 106 that varies in frequency from nine hundred cycles to eighteen hundred cycles cooperates with the periphery 89 and the position of the elevation angle to cam 90 to vary the output or generated frequency through the cam follower 108. The output frequency of said oscillator 106 is fed into and recorded on a fourth channel of the recorder 96.

By this method, an infinite number of tapes having identical characteristics can be produced. By interchanging or adding new cams, aircraft targets having any one of a variety of different characteristics can be produced and utilized.

Obviously many modifications and variations of the present invention are possible in the light of the above teachings. It is therefore to be understood that within the scope of the appended claims the invention may be practiced otherwise than as specifically described.

What is claimed is:

1. A device to generate synthetic radar targets in a radar set comprising a first tape containing a recorded signal of variable frequency to represent target elevation angle, a second recorded signal of variable frequency to represent target bearing angle, a third recorded signal to function as a trigger pulse for said radar set, a fourth recorded signal that is out of phase relative to said third recorded signal to indicate the range of a target, an oscillator operatively arranged to indicate radar antenna elevations by generating output signals of proportionate frequency values, a second oscillator operatively arranged to indicate radar antenna bearings by generating output signals of proportionate frequency values, voltage generating means to compare the frequency of said first mentioned recorded signal with the frequency of said first mentioned generated signal, second voltage generating means to compare the frequency of said second mentioned recorded signal with the frequency of said second mentioned generated signal, and means, coupled to said first and second voltage generating means and controlled by said fourth recorded signal, generating a target pulse for indication by said radar set when the frequencies of said compared generated and recorded signals are within a predetermined amount of each other.

2. A device to generate synthetic radar targets comprising recordings of a plurality of frequencies to represent respectively the range, bearing and elevation angle of a target, a first and a second oscillator, control means to vary the frequency of each of said oscillators to represent respectively the angle of elevation and bearing of a gun, a first mixer coupled to combine the recording and control means frequencies representing angle of elevation, a second mixer coupled to combine the recording and control means frequencies representing bearing, a first filter passing the difference of said angle of elevation frequencies, a second filter passing the difference of said bearing frequencies, a first gate coupled to the output of said first filter, a second gate coupled to the output of said second filter, and a blocking amplifier adapted to receive the recorded range information when said gates are both operative.

3. A device to generate synthetic radar targets for a radar unit comprising means to generate a plurality of programmed frequencies to represent respectively the angle of elevation, bearing and range of a programmed target, a plurality of oscillators calibrated to generate discrete frequencies that represent respectively the angle of elevation and the bearing of a gun, means to combine the programmed angle of elevation frequencies and said generated angle of elevation frequencies to obtain the difference between said frequencies, means to combine the programmed bearing frequencies and the generated bearing frequencies to obtain the difference between said frequencies, a first gate controlled by said difference in angle of elevation frequency and coupled to pass said programmed range frequency to such radar unit, and a second gate means controlled by said difference in bearing frequency and coupled to pass said programmed range frequency to said first mentioned gate.

4. A device to generate synthetic radar targets for a radar unit comprising means to generate a plurality of programmed frequencies to represent respectively the angle of elevation, bearing and range of a programmed target; a plurality of oscillators calibrated to generate discrete frequencies that represent respectively the angle of elevation and the bearing of a gun, means to combine the programmed angle of elevation frequencies and said generated angle of elevation frequencies to obtain the difference between said frequencies, means to combine the programmed bearing frequencies and the generated bearing frequencies to obtain the difference between said frequencies, a first gate controlled by said difference in angle of elevation frequency and coupled to pass said programmed range frequency to such radar unit, a second gate means controlled by said difference in bearing frequency and coupled to pass said programmed range frequency to said first mentioned gate, and means to wobble the frequency generated by said plurality of oscillators.

5. A device to generate synthetic radar targets for a radar unit comprising means to generate a plurality of programmed frequencies to represent respectively the angle of elevation, bearing and range of a programmed target, a plurality of oscillators calibrated to generate discrete frequencies that represent respectively the angle of elevation and the bearing of a gun, means to combine the programmed angle of elevation frequencies and said generated angle of elevation frequencies to obtain the difference between said frequencies, means to combine the programmed bearing frequencies and the generated bearing frequencies to obtain the difference between said frequencies, a first gate controlled by said difference in angle of elevation frequency and coupled to pass said programmed range frequency to such radar unit, a second gate means controlled by said difference in bearing frequency and coupled to pass said programmed range frequency to said first mentioned gate, a motor, and means operated by said motor to wobble the frequencies of said oscillators.

6. A device to generate synthetic radar targets for a radar unit comprising means to generate a plurality of programmed frequencies to represent respectively the angle of elevation, bearing and range of a programmed target, a plurality of oscillators calibrated to generate discrete frequencies that represent respectively the angle of elevation and the bearing of a gun, means to combine the programmed angle of elevation frequencies and said generated angle of elevation frequencies to obtain the difference between said frequencies, means to combine the programmed bearing frequencies and the generated bearing frequencies to obtain the difference between said frequencies, a first gate controlled by said difference in angle of elevation frequency and coupled to pass said programmed range frequency to such radar unit, a second gate means controlled by said difference in bearing frequency and coupled to pass said programmed range frequency to said first mentioned gate, a motor, and potentiometers operated by said motor and connected to said oscillators to wobble the frequencies of said oscillators.

7. A device to generate synthetic radar targets for a radar unit comprising means to generate a plurality of programmed frequencies to represent respectively the angle of elevation, bearing and range of a programmed target, a plurality of oscillators calibrated to generate discrete frequencies that represent respectively the angle of elevation and the bearing of a gun, means to combine the programmed angle of elevation frequencies and said generated angle of elevation frequencies to obtain the difference between said frequencies, means to combine the programmed bearing frequencies and the generated bearing frequencies to obtain the difference between said frequencies, a first gate controlled by said difference in angle of elevation frequency and coupled to pass said programmed range frequency to such radar unit, a second gate means controlled by said difference in bearing frequency and coupled to pass said programmed range frequency to said first mentioned gate, a motor, and variable condensers operated by said motor and connected to said oscillators to wobble the frequencies of said oscillators.

8. A device to generate synthetic radar targets comprising a plurality of programmed frequencies to represent the range, bearing and angle of elevation respectively of an aircraft target, a gun, a first oscillator coupled to said gun to indicate angles of elevation in the form of discrete frequencies, a second oscillator coupled to said gun to indicate bearing information in the form of discrete frequencies, a first mixer coupled to receive said first oscillator output and said programmed frequency that represents angle of elevation, a second mixer coupled to receive said second oscillator output and said programmed frequency that represents bearing, a first filter connected to receive the output of said first mixer to pass the difference of the two mixer input frequencies, a second filter connected to receive the output of said second mixer to pass the difference of the two mixer input frequencies, first converting means coupled to said first filter to change said output frequency into a plurality of negative pulses, second converting means connected to said second filter to change said output frequency into a plurality of negative pulses, a first vacuum tube coupled to receive the output of said first converting means to conduct current for a discrete number of negative pulses, a second vacuum tube coupled to receive the output of said second conducting means to conduct current for a discrete number of negative pulses, a first gate operated by said first vacuum tube, a second gate operated by said second vacuum tube, a third oscillator, and a programmed target range pulse to trigger said third oscillator at the instant that said first and second gates are both operative.

9. The combination of claim 8 wherein said converting means comprises a unit to square, differentiate and then clip the signal that is received from said filter to produce a plurality of negative pulses.

10. A device to generate synthetic radar targets comprising a plurality of programmed frequencies to represent the range, bearing and angle of elevation respectively of an aircraft target, a gun, a first oscillator coupled to said gun to indicate angles of elevation in the form of discrete frequencies, a second oscillator coupled to said gun to indicate bearing information in the form of discrete frequencies, a first mixer coupled to receive said first oscillator output and said programmed frequency that represents angle of elevation, a second mixer coupled to receive said second oscillator output and said programmed frequency that represents bearing, a first filter connected to receive the output of said first mixer to pass the difference of the two mixer input frequencies, a second filter connected to receive the output of said second mixer to pass the difference of the two mixer input frequencies, first converting means coupled to said first filter to change said output frequency into a plurality of negative pulses, second converting means connected to said second filter to change said output frequency into a plurality of negative pulses, a time delay network connected to receive said negative pulses from said first mentioned converting means, a first vacuum tube connected to said time delay network to conduct current for a discrete number of negative pulses, a second time delay network connected to receive said negative pulses from said first converting means, and a second vacuum tube connected to said time delay network to conduct current for a discrete number of negative pulses, a first gate operated by said first vacuum tube, a second gate operated by said second vacuum tube, a third oscillator, and a programmed target range pulse to trigger said third oscillator at the instant that said first and second gates are both operative.

11. A device to generate synthetic radar targets comprising a plurality of programmed frequencies to represent the range, bearing and angle of elevation respectively of an aircraft target, a gun, a first oscillator coupled to said gun to indicate angles of elevation in the form of discrete frequencies, a second oscillator coupled to said gun to indicate bearing information in the form of discrete frequencies, a first mixer coupled to receive said first oscillator output and said programmed frequency that represents angle of elevation, a second mixer coupled to receive said second oscillator output and said programmed frequency that represents bearing, a first filter connected to receive the output of said first mixer to pass the difference of the two mixer input frequencies, a second filter connected to receive the output of said second mixer to pass the difference of the two mixer input frequencies, first converting means coupled to said first filter to change said output frequency into a plurality of negative pulses, second converting means connected to said second filter to change said output frequency into a plurality of negative pulses, a time delay network connected to receive said negative pulses from said first mentioned converting means, a first vacuum tube connected to said time delay network to conduct current for a discrete number of negative pulses, a second time delay network connected to receive said negative pulses from said first converting means, and a second vacuum tube connected to said time delay network to conduct current for a discrete number of negative pulses, a first gate operated by said first vacuum tube, a second gate operated by said second vacuum tube, a third oscillator, and a programmed target range pulse to trigger said third oscillator at the instant that said first and second gates are both operative, a motor, and variable condensers coupled to said motor and coupled to said oscillators to wobble the frequency of said oscillators.

12. A device to generate synthetic radar targets in a radar set comprising, in combination: a recording containing first and second recorded signals which represent target elevation and bearing respectively by means of proportionate frequencies, a third recorded signal comprising a series of pulses to function as trigger pulses for said radar set, and a fourth recorded signal comprising a series of pulses phase displaced with respect to said pulses in said third series, the amount of phase displacement proportional to target range; first means, operatively coupled with the radar antenna system, generating signals proportional in frequency to the elevation and bearing of said antenna system, second means comparing the frequencies of said first recorded signal with said generated elevation signal and said second recorded signal with said generated bearing signal and producing output signals in accordance with said comparisons; and third means, coupled to receive said fourth recorded signal from said recording and said output signals from said comparison means, generating a target pulse for indication by said radar set when the frequencies of said compared signals are within a predetermined amount of each other.

13. A device to generate synthetic radar targets in a radar set comprising, in combination: a recording containing first and second recorded signals which represent target elevation and bearing respectively by means of proportionate frequencies, a third recorded signal comprising a series of pulses to function as trigger pulses for said radar set, and a fourth recorded signal comprising a series of pulses phase displaced with respect to said pulses in said third series, the amount of phase displacement proportional to target range; means deriving respective output signals from said recorded signals; means, operatively coupled with the radar antenna system, generating signals proportional in frequency to the elevation and bearing of said antenna system; means, coupled to said derivation means and said generation means, comparing the frequencies of said first recorded signal with said generated elevation signal and said second recorded signal with said generated bearing signal and producing output signals in accordance with said comparisons; and means, coupled to receive said fourth recorded signal from said recording and said output signals from said comparison means, generating a target pulse for indication by said radar set when the frequencies of said compared signals are within a predetermined amount of each other.

14. A device to generate synthetic radar targets in a radar set comprising, in combination: a recording containing first and second recorded signals which represent target elevation and bearing respectively by means of proportionate frequencies, a third recorded signal comprising a series of pulses to function as trigger pulses for said radar set, and a fourth recorded signal comprising a series of pulses phase displaced with respect to said pulses in said third series, the amount of phase displacement proportional to target range; means deriving respective output signals from said recorded signals; first means, operatively coupled with the radar antenna system, generating a signal proportional in frequency to the elevation of said antenna system; second means, operatively coupled with the radar antenna system, generating a signal proportional in frequency to the bearing of said antenna system; third means, coupled to said derivation means and said first means, comparing the frequencies of said first recorded signal and said first generated signal and producing a signal in accordance with their difference; fourth means, coupled to said derivation means and said second means, comparing the frequencies of said second recorded signal and said second generated signal and producing a signal in accordance with their difference; and fifth means, coupled to receive signals from said derivation means and said third and fourth comparison means, generating a target pulse for indication by said radar set when the frequencies of said compared generated and recorded signals are within a predetermined amount of each other.

References Cited in the file of this patent

UNITED STATES PATENTS

| | | |
|---|---|---|
| 2,397,475 | Dinga | Apr. 2, 1946 |
| 2,459,679 | Beyer et al. | Jan. 18, 1949 |
| 2,471,315 | Dehmel | May 24, 1949 |
| 2,517,591 | Nightenhelser | Aug. 8, 1950 |
| 2,522,541 | Saxton et al. | Sept. 19, 1950 |
| 2,524,847 | Springer | Oct. 10, 1950 |
| 2,548,684 | Roth | Apr. 10, 1951 |
| 2,555,442 | Hales | June 5, 1951 |
| 2,565,008 | Wallace | Aug. 21, 1951 |
| 2,602,243 | Link | July 8, 1952 |
| 2,677,199 | Droz | May 4, 1954 |
| 2,678,382 | Horn et al | May 11, 1954 |
| 2,774,149 | Garman et al. | Dec. 18, 1956 |